(12) United States Patent  
Forster et al.

(10) Patent No.: US 7,379,024 B2
(45) Date of Patent: May 27, 2008

(54) RFID TAG USING A SURFACE INSENSITIVE ANTENNA STRUCTURE

(75) Inventors: Ian J. Forster, Chelmsford (GB); Adrian N. Farr, Dunmow (GB); Norman A. Howard, Ilford (GB); Andrew W. Holman, West Hills, CA (US)

(73) Assignee: Avery Dennison Corporation, Pasadena, CA (US)

( * ) Notice: Subject to any disclaimer, the term of this patent is extended or adjusted under 35 U.S.C. 154(b) by 39 days.

(21) Appl. No.: 11/636,091

(22) Filed: Dec. 8, 2006

(65) Prior Publication Data

US 2007/0080233 A1    Apr. 12, 2007

Related U.S. Application Data

(60) Division of application No. 11/245,152, filed on Oct. 6, 2005, which is a continuation of application No. PCT/US2004/011218, filed on Apr. 12, 2004.

(60) Provisional application No. 60/517,156, filed on Nov. 4, 2003.

(51) Int. Cl.
*H01Q 1/38* (2006.01)
(52) U.S. Cl. ............................................. 343/700 MS
(58) Field of Classification Search ......... 343/700 MS, 343/702, 895; 340/572.1–572
See application file for complete search history.

(56) References Cited

U.S. PATENT DOCUMENTS

| | | | |
|---|---|---|---|
| 4,706,050 A | 11/1987 | Andrews | |
| 4,786,907 A | 11/1988 | Koelle | |
| 4,816,839 A | 3/1989 | Landt | |
| 5,153,983 A | 10/1992 | Oyama | |
| 5,430,441 A | 7/1995 | Bickley et al. | |
| 5,491,483 A | 2/1996 | D'Hont | |
| 5,545,291 A | 8/1996 | Smith et al. | |
| 5,557,279 A | 9/1996 | D'Hont | |
| 5,563,616 A | 10/1996 | Dempsey et al. | |
| 5,564,888 A | 10/1996 | Doan | |
| 5,621,199 A | 4/1997 | Calari et al. | |
| 5,783,856 A | 7/1998 | Smith et al. | |
| 5,793,305 A | 8/1998 | Turner et al. | |

(Continued)

FOREIGN PATENT DOCUMENTS

DE        197 03 864        6/1998

(Continued)

*Primary Examiner*—Huedung Mancuso
(74) *Attorney, Agent, or Firm*—Renner, Otto, Boisselle & Sklar, LLP (57) ABSTRACT

An RFID device includes conductive tabs, and a conductive structure, with a dielectric layer between the conductive tabs and the conductive structure. The conductive structure overlaps the conductive tabs and acts as a shield, allowing the device to be at least somewhat insensitive to the surface upon which it is mounted, or to the presence of nearby objects, such as goods in a carton or other container that includes the device. The dielectric layer may be a portion of the container, such as an overlapped portion of the container. Alternatively, the dielectric layer may be a separate layer, which may vary in thickness, allowing one of the conductive tabs to be capacitively coupled to the conductive structure. As another alternative, the dielectric layer may be an expandable substrate that may be expanded after fabrication operations, such as printing.

8 Claims, 5 Drawing Sheets

U.S. PATENT DOCUMENTS

| | | |
|---|---|---|
| 5,824,186 A | 10/1998 | Smith et al. |
| 5,854,480 A | 12/1998 | Noto |
| 5,874,724 A | 2/1999 | Cato |
| 5,904,545 A | 5/1999 | Smith et al. |
| 5,965,494 A | 10/1999 | Terashima et al. |
| 5,973,598 A | 10/1999 | Beigel |
| 5,977,877 A | 11/1999 | McCulloch et al. |
| 5,983,363 A | 11/1999 | Tuttle et al. |
| 6,001,211 A | 12/1999 | Hiroyuki |
| 6,043,746 A | 3/2000 | Sorells |
| 6,078,791 A | 6/2000 | Tuttle et al. |
| 6,104,291 A | 8/2000 | Beauvillier et al. |
| 6,107,920 A | 8/2000 | Eberhardt et al. |
| 6,133,836 A | 10/2000 | Smith |
| 6,140,967 A | 10/2000 | Kolsrud |
| 6,145,901 A | 11/2000 | Rich |
| 6,147,604 A | 11/2000 | Wiklof et al. |
| 6,147,605 A | 11/2000 | Vega et al. |
| 6,147,606 A | 11/2000 | Duan |
| 6,166,613 A | 12/2000 | Nakagawa et al. |
| 6,172,609 B1 | 1/2001 | Lu et al. |
| 6,204,764 B1 | 3/2001 | Maloney |
| 6,206,292 B1 | 3/2001 | Robertz et al. |
| 6,215,402 B1 | 4/2001 | Rao Kodukula et al. |
| 6,236,314 B1 | 5/2001 | Smith et al. |
| 6,236,316 B1 | 5/2001 | Eberhardt et al. |
| 6,243,013 B1 | 6/2001 | Duan et al. |
| 6,259,369 B1 | 7/2001 | Monico |
| 6,259,408 B1 | 7/2001 | Brady et al. |
| 6,262,682 B1 | 7/2001 | Shibata |
| 6,262,692 B1 | 7/2001 | Babb |
| 6,265,977 B1 | 7/2001 | Vega et al. |
| 6,274,508 B1 | 8/2001 | Jacobsen et al. |
| 6,278,369 B2 | 8/2001 | Smith et al. |
| 6,278,413 B1 | 8/2001 | Hugh et al. |
| 6,281,038 B1 | 8/2001 | Jacobsen et al. |
| 6,281,794 B1 | 8/2001 | Duan et al. |
| 6,281,850 B1 | 8/2001 | Klostermann |
| 6,285,342 B1 | 9/2001 | Brady et al. |
| 6,291,896 B1 | 9/2001 | Smith |
| 6,316,278 B1 | 11/2001 | Jacobsen et al. |
| 6,320,509 B1 | 11/2001 | Brady et al. |
| 6,320,545 B1 | 11/2001 | Nagumo et al. |
| 6,329,915 B1 | 12/2001 | Brady et al. |
| 6,339,385 B1 | 1/2002 | Tuttle |
| 6,342,866 B1 | 1/2002 | Ho et al. |
| 6,380,729 B1 | 4/2002 | Smith |
| 6,384,727 B1 | 5/2002 | Diprizio et al. |
| 6,392,544 B1 | 5/2002 | Collins et al. |
| 6,407,665 B2 | 6/2002 | Maloney |
| 6,417,025 B1 | 7/2002 | Gengel |
| 6,451,154 B1 | 9/2002 | Grabau et al. |
| 6,486,783 B1 | 11/2002 | Hausladen et al. |
| 6,501,435 B1 | 12/2002 | King et al. |
| 6,504,511 B2 | 1/2003 | Andersson |
| 6,535,175 B2 | 3/2003 | Brady et al. |
| 6,563,463 B1 | 5/2003 | Saito |
| 6,577,208 B2 | 6/2003 | Kushitani et al. |
| 6,600,420 B2 | 7/2003 | Goff et al. |
| 6,665,193 B1 | 12/2003 | Chung et al. |
| 6,667,092 B1 | 12/2003 | Brollier et al. |
| 6,683,254 B1 | 1/2004 | Gunnels |
| 6,690,264 B2 | 2/2004 | Dalglish |
| 6,703,985 B2 | 3/2004 | Lee |
| 6,720,866 B1 | 4/2004 | Sorrells et al. |
| 6,750,820 B2 * | 6/2004 | Killen et al. ......... 343/700 MS |
| 6,774,782 B2 | 8/2004 | Runyon et al. |
| 6,825,754 B1 | 11/2004 | Rolin |
| 6,838,377 B2 | 1/2005 | Tonami et al. |
| 6,856,285 B2 | 2/2005 | Bettin et al. |
| 6,888,502 B2 * | 5/2005 | Beigel et al. ......... 343/700 MS |
| 6,906,675 B2 * | 6/2005 | Satoh et al. ................. 343/767 |
| 6,914,562 B2 | 7/2005 | Forster |
| 6,951,596 B2 | 10/2005 | Green et al. |
| 7,075,435 B2 | 7/2006 | Jesser |
| 7,132,986 B2 * | 11/2006 | Inatsugu et al. ..... 343/700 MS |
| 7,292,148 B2 * | 11/2007 | Forster .................... 340/572.8 |
| 7,327,318 B2 * | 2/2008 | Frank et al. ......... 343/700 MS |
| 2001/0006368 A1 | 7/2001 | Maloney |
| 2001/0043162 A1 | 11/2001 | Babb |
| 2001/0053675 A1 | 12/2001 | Plettner |
| 2001/0054755 A1 | 12/2001 | Kirkham |
| 2002/0035701 A1 | 3/2002 | Casebolt et al. |
| 2002/0125566 A1 | 9/2002 | Tonami et al. |
| 2002/0126057 A1 | 9/2002 | King et al. |
| 2002/0145520 A1 | 10/2002 | Maloney et al. |
| 2002/0175873 A1 | 11/2002 | King et al. |
| 2003/0210188 A1 | 11/2003 | Hebron et al. |
| 2004/0001029 A1 | 1/2004 | Parsche et al. |
| 2004/0032330 A1 | 2/2004 | Hoffman |
| 2004/0032377 A1 | 2/2004 | Forster et al. |
| 2004/0046020 A1 | 3/2004 | Andreasson et al. |
| 2004/0046643 A1 | 3/2004 | Becker et al. |
| 2004/0059629 A1 | 3/2004 | Luo et al. |
| 2004/0066280 A1 | 4/2004 | Pratt et al. |
| 2004/0075607 A1 | 4/2004 | Cathey |
| 2004/0178912 A1 | 9/2004 | Smith et al. |
| 2006/0055542 A1 | 3/2006 | Forster et al. |

FOREIGN PATENT DOCUMENTS

| | | |
|---|---|---|
| DE | 101 36 502 | 2/2003 |
| EP | 0 254 954 | 7/1987 |
| EP | 0 896 706 | 4/1997 |
| GB | 2293050 | 9/1995 |
| WO | WO 82/00541 | 2/1982 |
| WO | WO 93/05489 | 3/1993 |
| WO | WO 00/16277 | 3/2000 |
| WO | WO 00/16280 | 3/2000 |
| WO | WO 00/41148 | 7/2000 |
| WO | WO 00/43952 | 7/2000 |
| WO | WO 01/50547 | 7/2001 |
| WO | WO 01/61646 | 8/2001 |
| WO | WO 01/71686 | 9/2001 |
| WO | WO 01/73864 | 10/2001 |
| WO | WO 01/79988 | 10/2001 |
| WO | WO 01/80174 | 10/2001 |
| WO | WO 02/29929 | 4/2002 |
| WO | WO 02/097723 | 12/2002 |
| WO | WO 03/009007 | 1/2003 |
| WO | WO 2004/025554 | 3/2004 |
| WO | WO 2004/036689 | 4/2004 |
| WO | WO 2004/046762 | 6/2004 |
| WO | WO 2004/093249 | 10/2004 |
| WO | WO 2005/073937 | 1/2005 |

* cited by examiner

RFID TAG USING A SURFACE INSENSITIVE ANTENNA STRUCTURE

This is a divisional of U.S. application Ser. No. 11/245,152, filed Oct. 6, 2005, which is a continuation of International Application No. PCT/US04/11218, filed Apr. 12, 2004, published in English as WO 2004/093246. International Application No. PCT/US04/11218 claims priority to U.S. Provisional Application No. 60/517,156, filed Nov. 4, 2003.

BACKGROUND OF THE INVENTION

1. Field of the Invention

This invention relates to the field of Radio Frequency Identification (RFID) tags and labels, and in particular to tags and labels that include a surface insensitive antenna structure.

2. Description of the Related Art

Current inventory and manufacturing methods rely on the ability to track and identify items of concern, such as inventory items, packages, individual parts, etc., and to communicate information concerning such items of concern in a wireless manner for processing and use. One known method of tracking and providing information on such items of concern is to attach to each such item a wireless communication device, such as an active or passive transponder, incorporated into an identification tag or label that responds to radio frequency interrogation and commands. The tag may store or represent information concerning the item to which it is attached, such as a unique identifying number, item status such as opened or unopened, location, and the like. The tag may be attached to an individual item or to packaging containing multiple items.

The present invention deals with the problems that arise in attempting to design and manufacture an RFID tag that has general applicability and can efficiently operate when the packaging and containers on which such a tag may be attached vary widely. For example, some items of interest are shipped in bulk in a single container made of cardboard or plastic, heavier items may be shipped in wooden boxes, and liquids and viscous materials may be shipped in metal containers. Specifically, the present invention is directed toward meeting the problems that arise in attempting to design and manufacture an antenna structure that will operate efficiently and properly over a wide range of such packaging and containers.

In general, an antenna connected to an RFID tag is designed for operation on a specific or narrow range of substrates on which it may be attached or upon which it may be otherwise coupled to. Other substrates will cause the radiation efficiency of the antenna to deteriorate from the designed optimal mounting substrates. Thus, the antenna, and consequently the tag, will no longer radiate properly as designed. This loss of antenna efficiency may be due to a number of variable packaging factors. One is that each substrate has its own dielectric characteristics that typically affect the impedance matching between the wireless communication device and its antenna. Impedance matching ensures the most efficient energy transfer between an antenna and the wireless communication device.

The substrates on which such antennas are attached therefore are important in designing the antenna and the subsequent operating efficiency of the RFID tag itself. Common substrates vary from the non-conductive, such as cardboard, to the conductive, such as foil. In fact, even within a single type of substrate the dielectric characteristics may vary, such as in cardboard packaging, the thickness of the cardboard substrate can differ from package to package, even the moisture content of the cardboard due to weather changes may cause a change in its dielectric characteristics. The radiation efficiency and operation of the antenna can be affected by these highly variable factors even if the antenna was designed for attachment to a cardboard substrate. Therefore, a need exists to provide an antenna for use with a wireless communication device in an RFID tag whose impedance and therefore radiation efficiency is substantially insensitive to the substrate on which it may be attached.

Some prior art systems attempt to overcome the problem of the varying dielectric characteristics of the packaging on which the tag is applied by mounting and encapsulating the wireless communication device and antenna system on a known substrate and then attaching the encapsulated system onto the subject packaging so that the RFID tag "floats" independently of the packaging on which it is mounted, i.e., it is separated from the package by some distance, such as label/ticket that is attached with a plastic fastener. The problem with this encapsulated RFID tag is that it is cumbersome, expensive, difficult to mount and protrudes from the surface of the packaging on which it is mounted, leaving it susceptible to damage and prone to fall off during handling of the packaging, leaving the item untagged.

To overcome these noted problems, RFID tag embodiments have been developed that are directly attached by adhesion to or printing on the surface of the packaging thereby resulting in a lower tag profile that is less prone to damage or removal during handling of the packaging. However, direct surface mounting of these antennas and tags cause their efficiency to suffer from the varying dielectric characteristics of the surfaces on which they are attached. Thus, these systems require that different tags be used on different packaging resulting in added cost, complexity and manufacturing inconvenience. Since it is preferable to tag each inventory item separately, the need for so many different tags multiples the problems greatly.

Other known prior art RFID tags have attempted to overcome the problem of the varying dielectric characteristics of the packaging and provide a generally, "one size fits all" tag, by designing tag antenna systems that are insensitive to the surfaces on which they are mounted.

One known such RFID tag structure that is insensitive to its mounting surface, is that described in U.S. Pat. No. 6,501,435 to King et al., titled "Wireless Communication Device and Method." This tag structure compensates for the varying substrate dielectric characteristics on which the RFID tabs are attached by utilizing an antenna structure where the radiating tabs are asymmetric with regard to their shape and size. The tab(s) may be attached to the surface of the package or dielectric material opposite the tab(s).

SUMMARY OF THE INVENTION

One aspect of the present invention relates to an antenna system and an RFID tag or label that is insensitive to or compensates for the substrate on which it is mounted.

The RFID tag includes a wireless communication device, such as a passive or active transponder that responds to a radio frequency signal to communicate stored information concerning a package or its contents.

The antenna system contains two or more tabs constructed out of conductive material. The tabs may act as a monopole or multiple array antenna and may further act to attach the wireless communication device of the tag to the packaging or container. Likewise the tabs may resonate at one or multiple frequencies of interest. Apertures in the packaging may be used in conjunction with the tabs to form slot antennas or antennas that have multiple resonant frequencies.

The tabs may be attached to, be printed on, or be formed by the surface of the package. In one embodiment, the tab(s) are attached to the surface of a package, which itself comprises a dielectric material. An example of this embodiment is attachment of the tabs to a corrugated cardboard box. This embodiment offers the advantage of efficiency, by eliminating the need for an additional dielectric material beyond that of the package itself. A disadvantage of this is that variability of the packaging material, such as its structure and its dielectric constant (the dielectric constant is the amount of permissivity of a particular material). This variability in turn can lead to unacceptable variations in the impedance of the RFID device.

Therefore, the tab(s) may be reactively coupled to the surface of the package through a dielectric material. The dielectric material can be an adhesive coated flexible label stock on which the tabs are mounted to attach the RFID device to a package. In one embodiment of the invention, the label stock is a flexible material, such as a polymeric film, that is manufactured in long rolls of flexible web material using roll-to-roll manufacturing techniques. The uniform tab design of this embodiment, as further explained herein, offers various manufacturing advantages in roll-to-roll manufacturing of label stock, such as simplifying the printing or other formation of the tabs; simplifying connection of the tabs to the microelectronic device; facilitating die cutting or other separation into individual labels or label inlays; and other advantages as are apparent to those skilled in the art.

The dielectric material of the package, or alternatively the dielectric material of the RFID tag, includes a conductive structure such as a ground plane opposite the conductive tab(s), which may act as a radio frequency reflecting shield.

Methods for manufacturing RFID labels are disclosed in PCT Publication No. WO 01/61646 by Moore North America, Inc., incorporated herein by this reference. The method disclosed in PCT Publication No. WO 01/61646 uses a number of different sources of RFID inlets, each inlet including an antenna and a chip. A plurality of webs is matched together and RFID labels are die cut from the webs, to produce RFID labels with a liner. Alternatively, linerless RFID labels are produced from a composite web with a release material on one face and pressure sensitive adhesive on the other, the labels formed by perforations in the web. Various alternatives are possible.

The tabs may be formed on the web using a wide variety of materials and processes. For example, one process involves printing on the web a conductive material, such as silver conductive ink, in a pattern defining multiple tabs. The ink may be printed for example using silk screening techniques, such as in a sheet fed or roll operation. The tabs are typically dried and stored on the web in a roll. However, as an alternative, the tabs may be wet printed during the label manufacturing process, in line with other process steps.

Additional suitable methods of forming the tabs include printing conductive ink, sputtering metal, laminating foil or hot-stamping, or any method known in the art for forming conductive patterns on a film.

The precision or definition of the printed elements of lines and spaces may be important to the performance of the tabs and the overall RFID device. With some tab designs, conventional printing may not provide adequate resolution, line/space separation or other quality characteristics necessary to deliver engineered performance.

Likewise, control of thickness and smoothness of the printed areas of the tabs can have an important effect on their performance. Variability due to ink formulation, environmental conditions, substrate specifications, process conditions and other factors can impact both the smoothness and final thickness of printed antennas. Surface tension effects underlie many of these variables and place constraints on the amount of ink that can be deposited, and how closely graphic elements can be positioned to one another.

In addition to a flexible dielectric base material that carried the tabs, an additional continuous web or sheet of selected materials may be provided to support and protect the tabs and microelectronic device, and/or to provide usable form factors and surface properties (e.g. printability, adhesive anchorage, weatherability, etc.) for specific applications. The base material and additional protective material(s) may be made of films, papers, laminations of films and papers, or other flexible sheet materials suitable for a particular end use. The resulting continuous web of RFID label stock or RFID tag stock may be overprinted with text and/or graphics, die-cut into specific shapes and sizes into rolls of continuous labels, or sheets of single or multiple labels, or rolls or sheets of tags.

In typical label constructions, the label is die cut, as with a wedge die or other cutting method known in the label art. In the case of a pressure sensitive adhesive label carried on a liner layer, the die cut may extend all the way through the cross-section of the label or the cut may extend only down to the liner layer. In this instance, the liner may be kept as a unified sheet of standard sheet size, with one or more removable labels on top of the sheet, as is typical in the labeling art. It is noted that an adhesive layer and corresponding release liner may be omitted, in the event that a tag rather than a label is desired.

In one embodiment, the label stock is a foam material as a foam material provides electrical as well as mechanical manufacturing advantages in providing a more efficient performance than some other materials such as cardboard, within relatively short, compact dimensions than would otherwise be required to produce the same results. The foam material also acts as a dielectric medium, as discussed further below, that makes for easier manufacturing and permits laminating flexibility and less cost than found with solid materials such as polypropylene which are fairly inflexible and costly in manufacturing and use.

Also, the manufacturing advantages of uniform tabs are seen to greatest advantage when the labels or tab sets as they are being manufactured on a web medium, are arranged on such medium in a regular array, such as an orthogonal row-and-column array. Just as the geometry of one embodiment involves one or more rows of tabs arrayed along the machine direction of a web of flexible dielectric stock, according to one embodiment each set of uniform tabs may be circumscribed by a well-defined area of the web. Most preferably this circumscribing area substantially takes the form of a rectangle.

Likewise, a ground plane or radio frequency reflecting member of the antenna structure or tag may be formed in association with the tag itself for better space and manufacturing efficiency using the web manufacturing process. In one method, the ground plane is formed or provided separately from the formation of the tabs on the long flexible web. In this case, the separately produced ground plane must later be associated with and properly positioned when the tag is placed on its desired packaging.

In another method, the ground plane is formed on the same web as the tabs, preferably along the machine direction of the web. The antenna tabs and the ground plane may be separated by a fold line, which may be a scored line on the web, for ease in application of the label to packaging. In this method, the antenna structure of the tag and its associated ground plane elements are formed together in a known and fixed spatial relationship and handled as a single unit for application to the desired packaging. In application, the tag is placed on a side of the packaging along an edge. In this position, the tag can be folded along a score line so that the antenna structure portion of the tag remains on the outside surface panel of the package, while the ground plane portion is positioned on the inside surface of the panel of the package opposite the antenna tabs to provide a radio frequency reflective ground plane. Intermediate the antenna tabs and the ground plane element of the tag is sandwiched the side of the packaging, which may be used by the label as a dielectric between these two label elements for better label operation.

In another embodiment, the tabs may be printed on a continuous webbing with a self-adhesive backing. When used, they are detached from the webbing and attached to the packaging in an automated procedure. In a different embodiment, the tabs are reactively coupled to the surface of the package through a dielectric material. The dielectric material may include an adhesive material placed on the tabs that doubles to attach the tag to a package. Alternatively, the dielectric material may include the material from which the package is constructed, such as a cardboard layer between the tabs and a grounding or radio frequency reflecting structure commonly referred to as a ground plane.

The antenna structure may be configured so that the impedance of the antenna system is not substantially affected by the substrate to which the wireless communication device is attached, so that it will remain within a known range of impedance for tag designing purposes. In one embodiment, the antenna arrangement is a dipole antenna formed by identically shaped tabs. The tabs are manufactured with an adhesive on one side so that they may be adhered to the surface of the substrate forming the packaging. The tabs are connected at feedpoints to the wireless communication device with transmission lines that may be conductive paths or wires.

It is also contemplated that the wireless communication device of the RFID tag may be recessed into an indentation formed in the packaging substrate so that the wireless communication device does not protrude from the substrate surface, making the RFID tag less prone to damage during handling of the packaging.

In another embodiment, the invention includes a tag that may be mounted on only one side of the packaging. In this embodiment at least two conductive tabs are arranged to form a dipole antenna. A thin dielectric is coupled to the conductive tabs and a ground plane, or radio frequency reflecting structure, is coupled to the thin dielectric so that the thin dielectric is between the conductive tabs and ground plane. The ground reflecting structure can be unitary, that is, formed from a single connected element such as a flat plate, or formed from a cooperating series of isolated components such as a series of non-connected flat plates.

According to an aspect of the invention, a radio frequency identification (RFID) device includes a pair of conductive tabs on a first surface of the dielectric layer; a conductive structure; and a dielectric layer between the conductive tabs and the conductive structure. The dielectric layer has a thinner portion and a thicker portion. One of the conductive tabs is at least partially on the thinner portion of the dielectric layer.

According to another aspect of the invention, a method of making an RFID device includes: forming a pair of conductive tabs on one face of a dielectric layer; and forming a thinner portion of the dielectric layer that is thinner than a thicker portion of the dielectric layer. One of the conductive tabs is at least partially on the thinner portion.

According to yet another aspect of the invention, an RFID device includes a pair of dielectric layers joined together to create an overlapping portion; a pair of conductive tabs on one of the dielectric layers, at the overlapping portion; and a conductive structure on the other of the dielectric layers, at the overlapping portion, the dielectric layers of the overlapping portion thereby being between the conductive structure and the conductive tabs.

According to still another aspect of the invention, a method of applying an RFID device to a container includes forming a overlapping portion of the container by overlapping and joining together a pair of parts of the container; forming a pair of conductive tabs at the overlapping portion on one of the parts of the container; and forming a conductive structure at the overlapping portion at the other of the parts of the container.

According to a further aspect of the invention an RFID device includes: an expandable substrate; and an antenna structure on one face of the substrate.

According to a still further aspect of the invention, an expandable substrate includes a middle film having multiple segments. A first part of each segment is attached to a top film and a second part of each segment is attached to a bottom film. A third part of each segment, between the first and second parts, rotates relative to the first and second parts when the top film is moved relative to the bottom film, thereby expanding the substrate.

According to another aspect of the invention, a method of forming an RFID device includes: printing one or more layers of the device atop an expandable substrate; and expanding the substrate, thereby increasing the thickness of the substrate.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, which are not necessarily according to scale.

DETAILED DESCRIPTION

The present invention is directed to a radio frequency identification device (RFID) and its antenna system as it is attached to a package or container to communicate information about the package or container to an external reader. The package may be an individual package containing specific, known contents, or an individual, exterior package containing within it a group of additional, interior individual packages. The word "package" and "container" are used interchangeably herein to describe a material that houses contents, such as goods or other individual packages, and equivalent structures. The present invention should not be limited to any particular meaning or method when either "package" or "container" is used.

An RFID device includes conductive tabs, and a conductive structure, with a dielectric layer between the conductive tabs and the conductive structure. The conductive structure overlaps the conductive tabs and acts as a shield, allowing the device to be at least somewhat insensitive to the surface upon which it is mounted, or to the presence of nearby objects, such as goods in a carton or other container that includes the device. The dielectric layer may be a portion of the container, such as an overlapped portion of the container. Alternatively, the dielectric layer may be a separate layer, which may vary in thickness, allowing one of the conductive tabs to be capacitively coupled to the conductive structure. As another alternative, the dielectric layer may be an expandable substrate that may be expanded after fabrication operations, such as printing.

Figure 1:
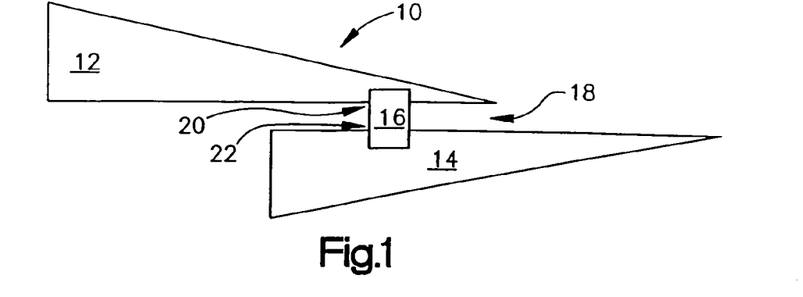
FIG. 1 is a schematic diagram of an RFID tag incorporating an antenna arrangement embodying the present invention.

FIG. 1 illustrates one embodiment of the present invention that is found in an RFID tag 10 that includes a wireless communication device 16. The device 16 may be either active in generating itself the radio frequency energy in response to a received command, or passive in merely reflecting received radio frequency energy back to an external originating source, such as current RFID tag readers known in the art.

In this embodiment, there are preferably at least two conductive tabs 12 and 14, coupled to the wireless communication device for receiving and radiating radio frequency energy received. The tabs 12 and 14 together form an antenna structure 17. The two tabs 12 and 14 are substantially identical in shape and are coupled to the wireless communication device 16 at respective feedpoints 20 and 22 that differ in location relative to each of the tabs. The tabs 12 and 14 may be generally identical in conducting area if the two tabs are of the same size as well as shape. Alternatively the tabs 12 and 14 may differ in size while their shape remains generally the same resulting in a different conducting area. The tabs 12 and 14 may be collinear or non-collinear to provide different desired antenna structures. For example, in FIG. 1 tabs 12 and 14 are offset and adjacent to provide a slot antenna system in area 18 that provides for resonance at multiple radiating frequencies for operation at multiple frequencies.

It is also contemplated that the invention includes having multiple arrays of conductive tabs that are connected to device 16. These tabs may be designed to work in unison with one another to form dipole or Yagi antenna systems, or singly to form monopole antennas as desired for the particular tag application. By using such multiple conductive tab arrays, multiple resonant frequencies may be provided so that the tag may be responsive to a wider range of tag readers and environmental situations than a single dedicated pair of conductive tabs. It will be appreciated that multiple conductive tabs to improve the range or directional characteristics in reading the RFID device.

Figure 2:
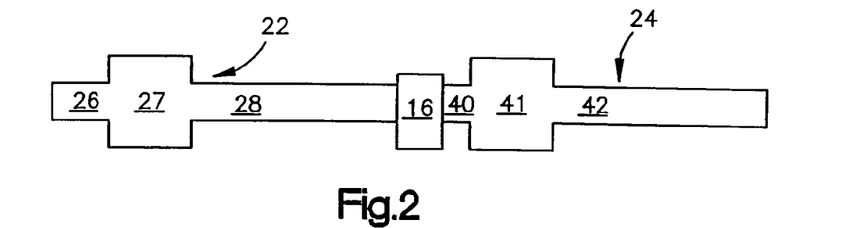
FIG. 2 is a schematic diagram of an RFID tag incorporating an alternative antenna arrangement embodying the present invention.
Figure 3:
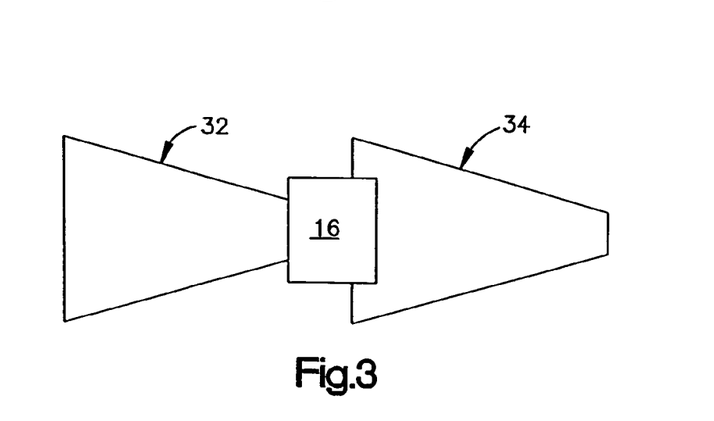
FIG. 3 is a schematic diagram of an RFID tag incorporating a second alternative antenna arrangement embodying the present invention.

Other considered shapes for the conductive tabs are illustrated in FIGS. 2 and 3 and include not only regular shapes such as the tapered, triangular shape illustrated in FIG. 1, but also truncated triangular shapes denoted by reference numbers 32 and 34 in FIG. 3.

Rectangular shaped conductive tabs are also included in this invention as illustrated in FIG. 2 as reference numbers 22 and 24. In fact, FIG. 2 illustrates, for example, that the tabs may include a series of contiguous rectangular portions 26, 27, 28 and 40, 41, 42.

In one embodiment of the invention, the rectangular portions shown in FIG. 2 will have dimensions substantially as follows: Rectangular portion 26 is about 3 millimeters wide by about 3 millimeters long; contiguous rectangular portion 27 is about 10 millimeters wide by about 107.6 millimeters long; and, rectangular portion 28 is about 3 millimeters wide by 15.4 millimeters long. With these dimensions, it is further preferred that the dielectric substrate have a thickness between the conductive tabs and the ground plane of about 6.2 millimeters for foam. Likewise, the ground plane for this preferred embodiment is about 16 millimeters wide by about 261 millimeters long.

The conductive tabs may also have irregular shapes, or even composite shapes that include both regular and irregular portions. Other alternative antenna systems that embody the present invention include those that have tabs with a triangular portion contiguous with a freeform curve or a regular curve such as a sinusoidal pattern.

In FIG. 1, the tab feedpoints 20 and 22, may be selected so that the impedance across the two feedpoints 20 and 22 of tabs 12 and 14, respectively, is a conjugate match of the impedance across the wireless communication device 16 to allow for a maximum transfer of energy therebetween.

In general, a method of selecting feedpoints on the tabs to achieve this conjugate impedance match, may be to select points on each tab differing in location where the width profile of each tab, taken along an axis transverse to the longitudinal centerline axis of each tab, differs from one another. That is, the feedpoints 20 and 22 may be selected such that the width of the tabs 12 and 14 at the feedpoints 20 and 22, taken along the centerline of the tab as you move away from the center of the tag where it connects to the communications device, measured against the length, differs between the two tabs 12 and 14. By choosing such points, either by calculation or trial and error, a conjugate impedance match can be achieved.

Specifically, with reference to the Figures, the longitudinal centerline axis of a tab is seen to be a line that remains equidistant from opposite borders or edges of the tab and extending from one end of the tab to the other. At times with regular shaped tabs, this longitudinal centerline axis will be a straight line similar to a longitudinal axis of the tab. At other times, with irregular shaped tabs, the longitudinal centerline axis will curve to remain equidistant from the borders. It is also seen that this longitudinal centerline axis is unique to each tab. The width of the tab is determined along an axis transverse to the longitudinal centerline axis and will be seen to be dependent upon the shape of the tab. For example, with a rectangular shaped tab, the width will not vary along the longitudinal centerline axis, but with a triangular or wedge shaped tab, the width will vary continuously along the longitudinal centerline axis of the tab. Thus, while it is contemplated that the present invention includes tabs having rectangular shaped portions, there will also be portions having different widths.

Another method of selecting the feedpoints on the conductive tabs, is to select a feedpoint differing in location on each of the tabs where the conducting area per unit length of the longitudinal centerline axis of each tab varies with distance along the longitudinal centerline axis of each of said tabs from its feedpoint. In essence, this method selects as a feedpoint a location on each tab where the integrated area of the shape per unit length of the centerline varies and is not necessarily the width of the tab.

Figure 4:
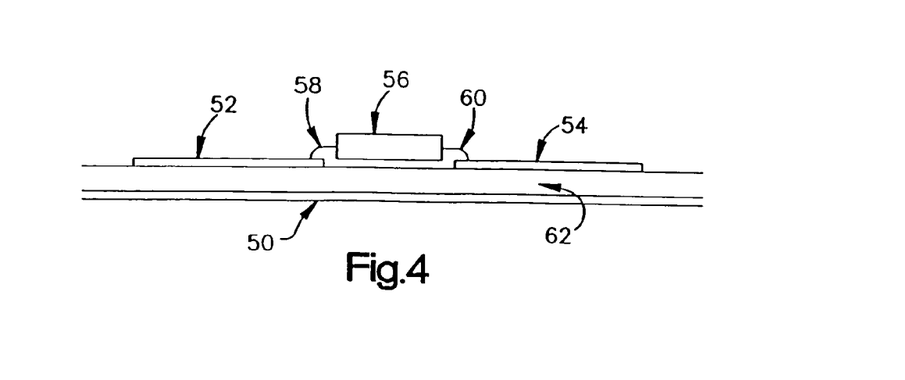
FIG. 4 is a cross sectional view of an RFID tag incorporating an antenna arrangement embodying the present invention as it would be mounted on a packaging sidewall.

FIG. 4 illustrates how a radio frequency reflecting structure or ground plane 50 is coupled to tabs 52 and 54, for reflecting radio frequency energy radiated from the tabs 52 and 54. The ground plane elements may be substantially the same size as the conductive tabs or greater, so that the ground plane elements may effectively reflect radio frequency energy. If the ground plane elements are substantially smaller than the conductive tabs, the radio frequency energy will extend beyond the edges of the ground plane elements and interact with the contents of the packaging causing deterioration in the operating efficiency of the label. In one embodiment, the ground plane 50 may extend at least about 6 mm beyond the boundary of the tabs 52 and 54.

In the illustrated embodiment the wireless communication device 56 is connected at feedpoints 58 and 60 to the tabs 52 and 54. This structure 50 may be a simple ground plane made from a single, unitary plate or a complex reflecting structure that includes several isolated plates that act together to reflect radio frequency energy. If the antenna structure is located on one side of a package wall 62, the radio frequency reflecting structure 50 may be on the opposite side of the same wall 62 using the wall itself as a dielectric material as described further below.

As indicated above, a dielectric material is preferably located intermediate the conductive tabs 52 and 54, and the radio frequency reflecting structure 50. An example of such a dielectric material is the packaging wall 62 described above. The thickness or the dielectric characteristic of the dielectric intermediate the tabs and radio frequency reflecting structure may be varied along a longitudinal or transverse axis of the tabs. Generally, it has been found that at UHF frequencies, defined as a band in the range of 860 MHz to 950 MHz, a dielectric thickness of about 3 millimeters to 6 millimeters is suitable for a tag embodying the present invention. Likewise, a dielectric thickness of about 0.5 millimeter to about 3 millimeters is suitable for a tag designed to operate in a band centered on 2450 MHz. This range of thickness has been found to be suitable for efficient operation of the conductive tabs despite the normally believed requirement for a separation distance of a quarter of a wavelength of the operating frequency between the radiating element and ground plane.

With the present invention advantages have been found in both manufacturing and application of the labels in that a thinner, lower dielectric material may be used in label construction, as well as the fact that shorter tabs may be utilized resulting in a manufacturing savings in using less ink and label materials in constructing each label and in increasing the label density on the web medium during manufacturing making less wasted web medium. Also such thinner and smaller labels are easier to affix to packaging and less likely to be damaged than those thicker labels that protrude outwardly from the packaging surface to which they are attached.

Another embodiment of the present invention is directed toward the antenna structure itself as described above without the wireless communication device.

Figure 5:
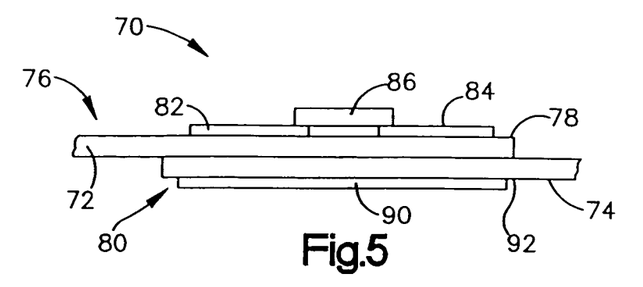
FIG. 5 is a cross sectional view of an RFID device of the present invention mounted on an overlapping portion of a carton.

Turning now to FIG. 5, an RFID device 70 is illustrated mounted on parts 72 and 74 of a carton 76. The device 70 is located on an overlapping portion 80 of the carton 76, where the parts 72 and 74 overlap one another. The parts 72 and 74 may be adhesively joined in the overlapping portion. Alternatively, the parts 72 and 74 of the carton 76 may be joined by other means, such as suitable staples or other fasteners. On one side or major face 78 of the overlapping portion 80 are conductive tabs 82 and 84, and a wireless communication device 86, such as an RFID chip or strap. A radio frequency reflecting structure or ground plane 90 is on an opposite side or major face 92 of the overlapping portion 80.

The overlapping portion 80 of the carton 76 thus functions as a dielectric between the conductive tabs 82 and 84, and the wireless communication device 86. Performance of the RFID device 70 may be enhanced by the additional thickness of the overlapping portion 80, relative to single-thickness (non-overlapped) parts of the carton parts 72 and 74. More particularly, utilizing a double-thickness overlapped carton portion as the dielectric for an RFID device may allow for use of such devices on cardboard cartons having thinner material. For example, some cartons utilize a very thin cardboard, such as 2 mm thick cardboard. A single thickness of 2 mm thick cardboard may be unsuitable or less suitable for use with surface-insensitive RFID device such as described herein.

The RFID device 70 shown in FIG. 5 may be produced by printing conductive ink on the opposite sides (major faces) 78 and 92 of the overlapping portion 80, to form the conductive tabs 82 and 84, and the reflecting structure 90. It will be appreciated that a variety of suitable printing methods may be used to form the tabs 82 and 84, and the reflecting structure 90, including ink jet printing, offset printing, and Gravure printing.

The wireless communication device 86 may be suitably joined to the conductive tabs 82 and 84 following printing of the conductive tabs 82 and 84. The joining may be accomplished by a suitable roll process, for example, by placing the communication device 86 from a web of devices onto the tabs 82 and 84.

It will appreciated that the printing may be performed before the carton parts 72 and 74 are overlapped to form the overlapping portion 80, or alternatively that the printing may in whole or in part be performed after formation of the overlapping portion 80. The conductive ink may be any of a variety of suitable inks, including inks containing metal particles, such as silver particles.

It will be appreciated that formation of the conductive tabs 82 and 84, and/or the reflective structure 90 may occur during formation of the carton parts 72 and 74, with the conductive tabs 82 and 84 and/or the reflective structure 90 being for example within the carton parts 72 and 74. Forming parts of the RFID device 70 at least partially within the carton parts 72 and 74 aids in physically protecting components of the RFID device 70 from damage. In addition, burying some components of the RFID device 70 aids in preventing removal or disabling of the RFID device 70, since the RFID device 70 may thereby be more difficult to locate.

Figure 6:
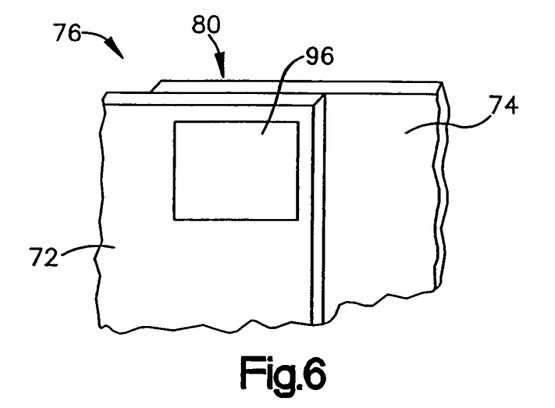
FIG. 6 is an oblique view of a marker printed on a portion of a carton or other container, indicating where a reflective conductive structure is to be located.

In one embodiment, the conductive tabs 82 and 84 may be printed onto the interior of the carton parts 72. As illustrated in FIG. 6, a marker 96 may be printed or otherwise placed on one of the carton parts 72 and 74 to indicate where the reflective structure 90 is subsequently to be placed.

The conductive tabs 82 and 84 may have any of the suitable shapes or forms described herein. Alternatively, the conductive tabs 82 and 84 may have other forms, such as shapes that are asymmetric with one another. The conductive tabs 82 and 84 may have configurations that are tunable or otherwise compensate for different substrate materials and/or thicknesses, and/or for other differences in the environment encountered by the RFID device 70, such as differences in the types of contents in a carton or other container on which the RFID device 70 is mounted.

Figure 7:
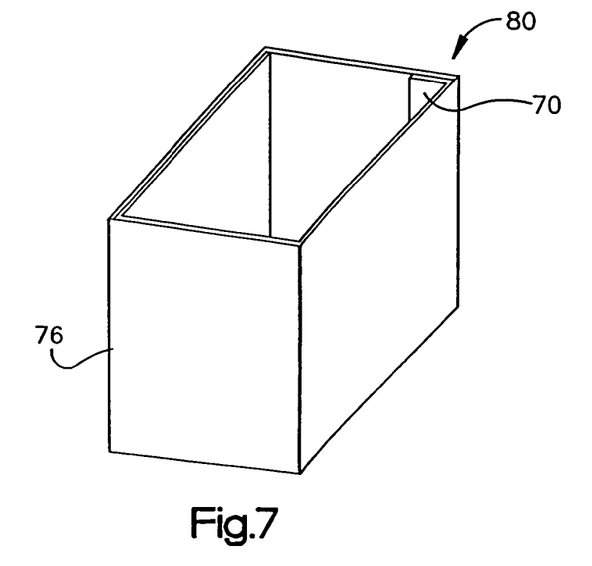
FIG. 7 is an oblique view illustrating placement of the RFID device of FIG. 6.

The RFID devices 70 illustrated in FIGS. 5 and 6 enable mounting of devices on a wider range of packaging materials, with the reflective structure 90 providing a "shield" to reduce or prevent changes in operation of the RFID device 70 due to differences in the types of merchandise or other material stored in a carton or other container upon which the RFID device 70 is mounted. As illustrated in FIG. 7, the RFID device 70 may be located on a carton or other container 98, oriented so that the reflective structure 90 is interposed between the conductive tabs 82 and 84, and the interior of the container 98.

Figure 8:
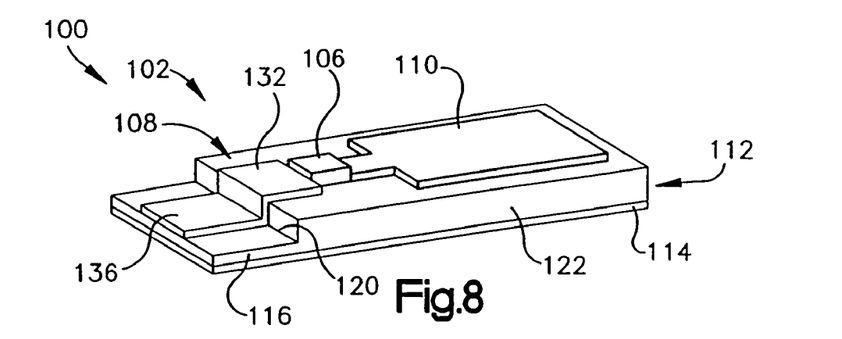
FIG. 8 is an oblique view of an RFID device in accordance with the present invention, having a monopole antenna structure.

FIG. 8 shows the operative components of another embodiment RFID device, an RFID device 100 having an essentially monopole antenna structure 102. The RFID device 100 includes a wireless communication device 106 (e.g., a strap) that is coupled to a pair of conductive tabs 108 and 110 that are mounted on a substrate 112, with a reflective structure or ground plane 114 on an opposite side of the substrate 112 from the conductive tabs 108 and 110.

At least part of one of the conductive tab 108 is capacitively coupled to the reflective structure 114, by being mounted on a thinner portion 116 of the substrate 112, which has a thickness less than that of the portion of the substrate 112 underlying the conductive tab 110. It will be appreciated that, with proper attention to matching, electrically coupling the tab 108 to the conductive reflective structure 114, allows operation of the RFID device 100 as a monopole antenna device. The relative thinness of the thinner portion 116 facilitates capacitive electrical coupling between the conductive tab 108 and the conductive reflective structure 114.

The conductive tab 110 functions as a monopole antenna element. The conductive tab 110 may have a varying width, such as that described above with regard to other embodiments.

The matching referred to above may include making the relative impedances of the antenna structure 102 and the wireless communication device 106 complex conjugates of one another. In general, the impedance of the antenna structure 102 will be a series combination of various impedances of the RFID device 100, including the impedance of the conductive tab 108 and its capacitive coupling with the reflective structure 114.

The thinner portion 116 may be made thinner by inelastically compressing the material of the substrate 112. For example the substrate 112 may be made of a suitable foam material, such as a suitable thermoplastic foam material, which may be a foam material including polypropylene and/or polystyrene. A portion of the substrate 112 may be compressed by applying sufficient pressure to rupture cells, causing the gas in the cells to be pressed out of the foam, thereby permanently compressing the foam.

The compressing described above may be performed after the formation of the tabs 108 and 110 on the substrate 112. The pressure on the tab 108 and the portion of the substrate 112 may be directed downward and sideways, toward the center of the RIFD device 100, for example where the wireless communication device 106 is mounted. By pressing down and in on the conductive tab 108 and the substrate 112, less stretching of the material of the conductive tab 108 occurs. This puts less stress on the material of the conductive tab 108, and may aid in maintaining integrity of the material of the conductive tab 108.

As an alternative, it will be appreciated that the conductive tabs 108 and 110 may be formed after compression or other thinning processes to produce the thinned portion 116 of the substrate 112. The conductive tabs 108 and 110 may be formed by suitable processes for depositing conductive material, such as by printing conductive ink.

With reference again to FIG. 8, the substrate 112 may have a sloped region 120 between its thicker portion 122 and the thinner portion 116. The sloped region 120 may aid in reducing stresses on the conductive tab 108 when the conductive tab 108 is placed prior to compressing of the thinner portion 116, by increasing the area of the conductive tab 108 that is under stress. When the thinner portion 116 is compressed prior to printing or other depositing of the conductive tab 108, the sloped region 120 may aid in ensuring conduction between a first part 132 of the conductive tab 108 that is on the thicker portion 122 of the substrate 112, and a second part 136 of the conductive tab 108 that is on the thinner portion 116 of the substrate 112.

It will be appreciated that a variety of suitable methods may be utilized to produce the thinner portion 116 of the substrate 112. In addition to the compressing already mentioned above, it may be possible to heat a portion of the substrate, either in combination with compression or alone, to produce the thinner portion 116. For example, a thermoplastic foam material may be heated and compressed by running it through a pair of rollers, at least one of which is heated. The thermoplastic film may be compressed over an area, and turned into a solid thermoplastic sheet, thus both reducing its thickness and increasing its dielectric constant. Alternatively, material may be removed from a portion of the substrate 112, by any of a variety of suitable methods, to produce the thinner portion 116.

As suggested above, the proximity of the second conductive tab part 136 to the conducting reflective structure 114, with only the thinner portion 116 of the substrate 112 between, aids in capacitively coupling the second part 136 and the reflective structure 114. In a specific example, a 3.2 mm thick foam dielectric was compressed over a 20 mm×10 mm area, to a thickness of 0.4 mm. This raised the dielectric constant of the plastic foam material from 1.2 to 2.2. Therefore, due to the reduced thickness of the foam and the increased dielectric constant of the substrate material in the thinner portion 116, the total capacitance was increased from 0.66 pF to 9.7 pF, which has a reactance of 17.8 ohms at 915 MHz.

Figure 9:
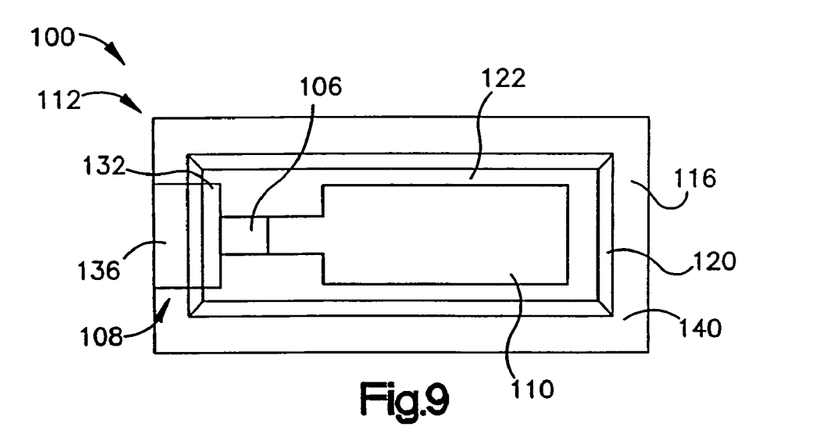
FIG. 9 is a plan view of one embodiment of the RFID device of FIG. 8.

With reference now to FIG. 9, the RFID device 100 may include a compressed border or ridge edge 140 substantially fully surrounding the device 100. Part of the compressed ridge edge 140 serves as the thinner portion 116 for capacitively coupling the second part 136 of the conductive tab 108 to the reflective structure 114. The remainder of the compressed ridge edge 140 may serve a mechanical structural function, providing a rigid edge to the RFID device 100 to prevent flexing of the RFID device 100.

Figure 10:
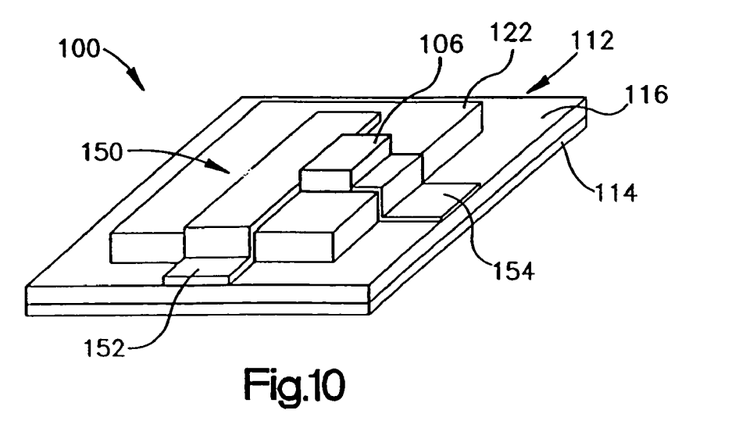
FIG. 10 is an oblique view of another embodiment of the RFID device of FIG. 8.

Another embodiment of the RFID device 100 is illustrated in FIG. 10. The RFID device in FIG. 10 includes a resonator (a conductive tab) 150 with a capacitive ground 152 at one end. The wireless communication device 106 is coupled to the resonator 150 at a suitable impedance point. The wireless communication device 106 is also coupled to a capacitive ground 154. The connection point between the wireless communication device 106 and the resonator 150 may be selected to suitably match impedances of the wireless communication device 106 and the active part of the resonator 150.

The RFID devices 100 illustrated in FIGS. 8-10 may be suitable for use as labels, such as for placement on cartons containing any of a variety of suitable materials. The RFID devices 100 may include other suitable layers, for example an adhesive layer for mounting the RFID device 100 on a carton, another type of container, or another object.

Figure 11:
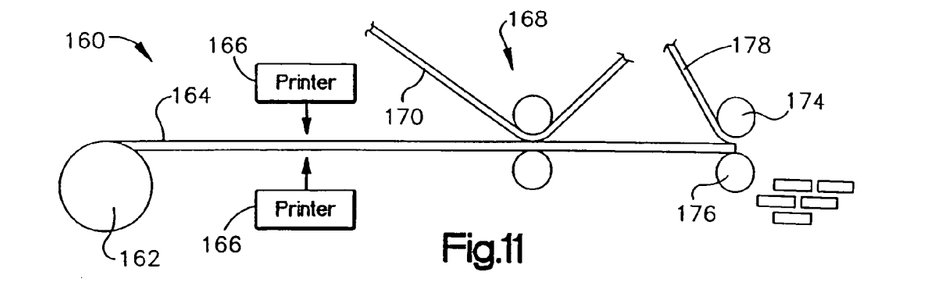
FIG. 11 is a schematic view showing a system for producing the RFID device of FIG. 8.

The RFID device 100 may be produced using suitable roll operations. FIG. 11 shows a schematic diagram of a system 160 for making RFID devices, such as the RFID device 100. Beginning with a roll 162 of a substrate material 164, a suitable printer 166 prints the conductive tabs 108 and 110 (FIG. 8) and the reflective structure 114 (FIG. 8) on opposite sides of the substrate material 164. It will be appreciated that the printer 166 may actually include multiple printers, for example to print the conductive tabs in a separate operation from the printing of the reflective structure.

A placement station 168 may be used to place the wireless communication devices 106 (FIG. 8), such as straps. The wireless communication devices 106 may be transferred to the substrate material 164 from a separate web of material 170. Alternatively, it will be appreciated that other methods may be used to couple the wireless communication devices 106 to the substrate material 164. For example, a suitable pick-and-place operation may be used to place the wireless communication devices 106.

Finally, the substrate material 164 is passed between a pair of rollers 174 and 176. The rollers 174 and 176 may be suitably heated, and have suitably-shaped surfaces, for example including suitable protrusions and/or recesses, so as to compress a portion of the substrate material 164, and to separate the RFID devices 100 one from another. In addition, a protective surface sheet 178 may be laminated onto the sheet material 164, to provide a protective top surface for the RIFD devices 100. It will be appreciated that the compressing, laminating, and cutting operations may be performed in separate steps, if desired.

It will be appreciated that other suitable processes may be used in fabricating the RFID devices 100. For example, suitable coating techniques, such as roll coating or spray coating, may be utilized for coating one side of the devices with an adhesive, to facilitate adhering the RFID devices to cartons or other containers.

The RFID device 100, with its monopole antenna structure 102, has the advantage of a smaller size, when compared with similar devices having dipole antenna structures. The length of the tag can be nearly halved with use of a monopole antenna, such as in the device 100, in comparison to a dipole antennaed device having similar size of antenna elements (conductive tabs). By having RFID devices of a smaller size, it will be appreciated that such devices may be utilized in a wider variety of applications.

Figure 12:
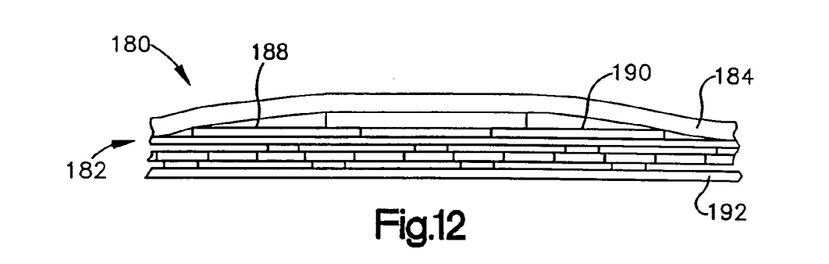
FIG. 12 is a cross sectional view of an RFID device in accordance with the present invention, having an expandable substrate.

FIG. 12 shows an RFID device 180 having an expandable substrate 182, which can be maintained during manufacturing and processing operations with a reduced thickness. The reduced thickness, which may be from about 0.05 mm to 0.5 mm, may advantageously allow the RFID device 180 to pass through standard printers, for example to print a bar code or other information on a label 184 that is part of the RFID device 180. After performing operations that take advantage of the reduced thicknesses of the substrate 182, the substrate 182 may be expanded, increasing its thickness to that shown in FIG. 12.

The RFID device 180 has many of the components of other of the RFID devices described herein, including a wireless communication device 186 and a pair of conductive tabs 188 and 190 on one side of the substrate 182, and a reflective structure (conductive ground plane) 192 on the other side of the substrate 182.

Figure 13:
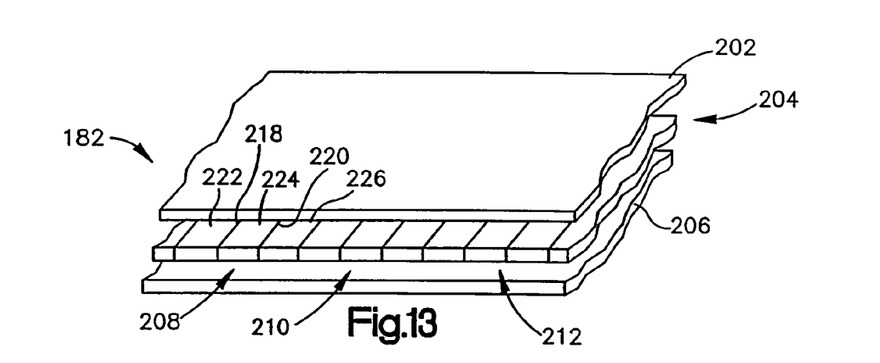
FIG. 13 is an exploded view of the expandable substrate of the device of FIG. 12.
Figure 14:
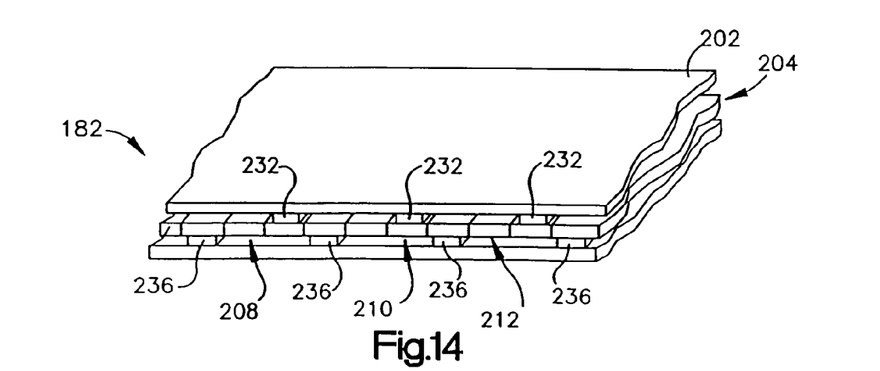
FIG. 14 is an oblique view of the expandable substrate of the device of FIG. 12, in a compressed state.
Figure 15:
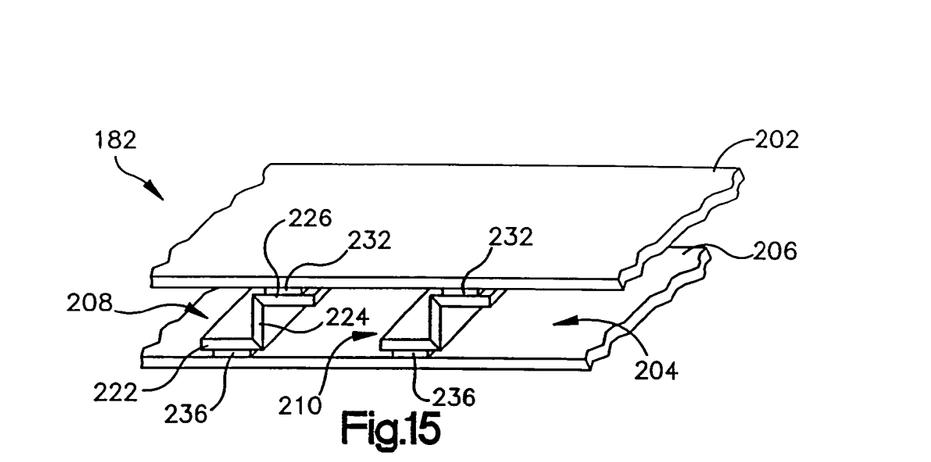
FIG. 15 is an oblique view of the expandable substrate of the device of FIG. 12, illustrating expansion of the substrate.

Referring now in addition to FIGS. 13-15, details of the structure of the expandable substrate 182 are now given. The expandable substrate 182 includes a top layer 202, a middle layer 204, and a bottom layer 206. The middle layer 204 is scored so as to be separated into segments 208, 210, and 212, as a shear force is applied to the top layer 202 relative to the bottom layer 206. The segments 208, 210, and 212 are in turn scored on fold lines, such as the fold lines 218 and 220 of the segment 208. The scoring along the fold lines 218 allows parts 222, 224, and 226 of the segment 208 to fold relative to one another as shear force is applied between the top layer 202 and the bottom layer 206.

Each of the segments 208, 210, and 212 has three parts. The top layer 202 has adhesive pads 232 selectively applied to adhere the bottom layer 202 to the parts on one side of the segments 208, 210, and 212 (the rightmost parts as shown in FIGS. 12-15). The bottom layer 206 has adhesive pads 236 selectively applied to adhere the bottom layer 206 to the parts on one side of the segments 208, 210, and 212 (the leftmost parts as shown in FIGS. 12-15). The middle parts of each of the segments 208, 210, and 212 are not adhesively attached to either the top layer 202 or the bottom layer 206, but are left free to flex relative to the segment parts on either side.

With the expandable substrate 182 put together as shown in FIG. 14, the top layer 202 and the bottom layer 206 being selectively adhered to segment parts of the middle layer 204, other operations may be performed on the substrate 182 in its compressed state. For example, the conductive tabs 188 and 190 may be formed on the top layer 202, and the reflective structure 192 may be formed or placed on the bottom layer 206. The wireless communication device 186 may be placed in contact with the conductive tabs 188 and 190. Printing operations may be performed to print on the label 184 of the RFID device 180. As noted above, the thickness of the compressed substrate 182 may allow the RFID device to pass through a standard printer for printing the label or for performing other operations. In addition, the compressed substrate 182 may be easier to use for performing other fabrication operations.

After fabrication operations that utilize the compressed substrate 182, the substrate 182 may be expanded, as illustrated in FIG. 15. When a shear force 240 is applied to the top layer 202 relative to the bottom layer 206, the top layer 202 shifts position relative to the bottom layer 206. The end parts of the segments 208, 210, and 212, some of which are adhesively adhered to the top layer 202 and others of which are adhered to the bottom layer 206, also move relative to one another. As the end parts of the segments 208, 210, and 212 shift relative to one another, the middle parts of the segments 208, 210, and 212 fold relative to the end parts along the fold lines between the segment parts. The middle parts of the segments 208, 210, and 212 thus deploy and separate the top layer 202 and the bottom layer 206, expanding the substrate 182 and increasing the thickness of the expandable substrate 182. The result is a corrugated structure. The expanded substrate 182 has low dielectric loss in comparison with solid materials. With the increased separation between the conductive tabs 188 and 190 due to expansion of the substrate 182, the expanded substrate 182 is suitable for use as a dielectric for a surface-independent RFID tag structure.

The shear force 240 between the top layer 202 and the bottom layer 206 may be applied in any of a variety of suitable ways. For example, the shear force 240 may be applied by suitably configured rollers, with the rollers having different rates of rotation or differences in gripping surfaces. Alternatively, one of the layers 202 and 206 may include a suitable heat shrink layer that causes relative shear between the layers 202 and 206 when the substrate 182 is heated.

The expandable substrate 182 may be fixed in expanded configuration by any of a variety of suitable ways, such as by pinning the ends of the layers 202 and 206; sticking together suitable parts of the substrate 182; filling gaps in the substrate 182 with a suitable material, such as polyurethane foam; and suitably cutting and bending inward portions of the ends of the middle parts of the segments.

The layers 202, 204, and 206 may be layers made out of any of a variety of suitable materials. The layers may be made of a suitable plastic material. Alternatively, some or all of the layers may be made of a paper-based material, such as a suitable cardboard. Some of the layers 202, 204, and 206 may be made of one material, and other of the layers 202, 204, and 206 may be made of another material.

The RFID devices 180 may be suitable for use as a label, such as for placement on cartons containing any of a variety of suitable materials. The RFID device 180 may include other suitable layers, for example an adhesive layer for mounting the RFID device 180 on a carton, another type of container, or another object.

It will be appreciated that the RFID device 180 may be used in suitable roll processes, such as the processes described above with regard to the system of FIG. 11. As stated above, the expandable substrate may be in a compressed state during some of the forming operations, for example being expanded only after printing operations have been completed.

Figure 16:
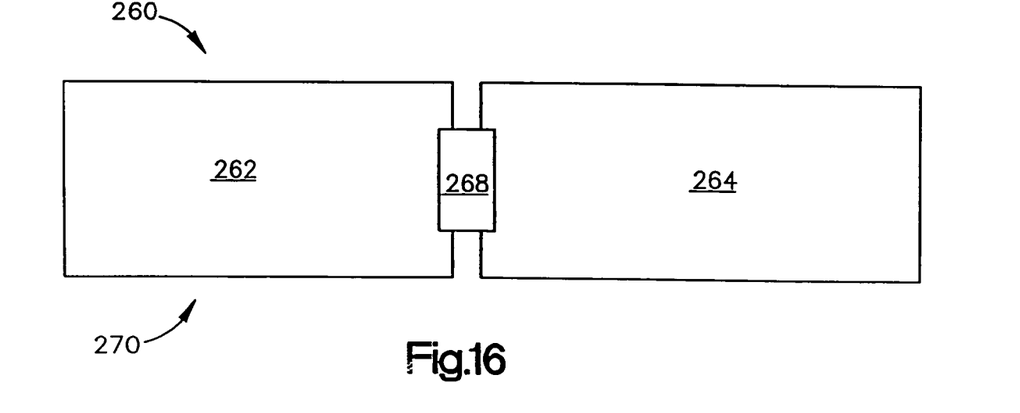
FIG. 16 is a plan view of an RFID device in accordance with the present invention, having generally rectangular conductive tabs.

FIG. 16 illustrates an RFID device 260 that has a pair of generally rectangular conductive tabs 262 and 264 that have a substantially constant width along their length. More particularly, the conductive tabs 262 and 264 each may have a substantially constant width in a direction transverse to a longitudinal centerline axis of the tab. The conductive tabs 262 and 264 form an antenna structure 270 that is coupled to a wireless communication device 268 such as an RFID chip or strap. The generally rectangular conductive tabs 262 have been found to be effective when used in conjunction with conductive structures such as the reflecting structures or ground planes described above.

It will be appreciated that the RFID device 260 is one of a wider class of devices having conductive tabs with substantially constant width, that may be effectively used with a reflective conductive structure. Such conductive tabs may have shapes other than the generally rectangular shapes illustrated in FIG. 16.

Certain modifications and improvements will occur to those skilled in the art upon a reading of the foregoing description. It should be understood that the present invention is not limited to any particular type of wireless communication device, tabs, packaging, or slot arrangement. For the purposes of this application, couple, coupled, or coupling is defined as either directly connecting or reactive coupling. Reactive coupling is defined as either capacitive or inductive coupling. One of ordinary skill in the art will recognize that there are different manners in which these elements can accomplish the present invention. The present invention is intended to cover what is claimed and any equivalents. The specific embodiments used herein are to aid in the understanding of the present invention, and should not be used to limit the scope of the invention in a manner narrower than the claims and their equivalents.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A radio frequency identification (RFID) device comprising:
   a pair of conductive tabs on a first surface of the dielectric layer;
   a conductive structure; and
   a dielectric layer between the conductive tabs and the conductive structure;

wherein the dielectric layer has a thinner portion and a thicker portion; and wherein one of the conductive tabs is at least partially on the thinner portion of the dielectric layer.

2. The device of claim 1, wherein the other of the conductive tabs is substantially completely on the thicker portion of the dielectric layer.

3. The device of claim 1, wherein the one of the conductive tabs is capacitively coupled to the conductive structure across the thinner portion; and wherein the thicker portion inhibits capacitive coupling between the conductive structure and the conductive tabs or portions thereof on an opposite side of the thicker portion.

4. The device of claim 1, wherein both of the conductive tabs are at least partially on the thinner portion of the dielectric layer.

5. The device of claim 1, wherein the thinned portion is a compressed material; and wherein the thinned portion extends substantially fully around the dielectric layer.

6. The device of claim 1, wherein the dielectric material includes a sloped area between the thinner portion and the thicker portion.

7. A method of making the RFID device of claim 1, the method comprising:

forming the pair of conductive tabs on one face of a dielectric layer; and forming the thinner portion of the dielectric layer.

8. The method of claim 7, wherein the forming the thinner portion includes applying both a compressing force generally perpendicular to the face of the dielectric layer, and a sideways force generally parallel to the face of the dielectric layer.

* * * * *